United States Patent Office 2,767,154
Patented Oct. 16, 1956

2,767,154

METHOD OF PRODUCING PIGMENTED LACQUERS AND THE LIKE

Adolf Weihe, Kronberg (Taunus), Germany, assignor to Deutsche Gold- und Silber-Scheideanstalt vormals Roessler, Frankfurt, Germany No Drawing. Application July 5, 1952,
Serial No. 297,383

Claims priority, application Germany July 4, 1951

7 Claims. (Cl. 260—33.6)

The present invention relates to improved rolled pigment masses for use in paint, lacquer and the like and a method of their production.

It has long been known to transform pigments into a highly dispersed form by rolling them in conjunction with collodion cotton and plasticizers usually with the addition of resins and dispersing agents, and to employ the resulting rolled pigment masses in the production of paints, lacquers, varnishes, enamels and the like. The technical properties of these rolled nitrocellulose containing pigment masses depend upon the high shearing forces to which these masses have been subjected during the friction rolling. The advantage in using such rolled masses, which are usually supplied in the form of chips resides in the fact that the usual time consuming grinding of the pigments in the lacquer industry can be omitted and that the usual grinding equipment used in the lacquer industry does not provide as high a degree of dispersion for most pigments.

The use of such nitrocellulose containing rolled pigment masses was, however, previously limited to such lacquers in which the film formers are employed which contain nitrocellulose or which are compatible with nitrocellulose. As soon as it is desired to pigment lacquers which contain solvents which are primarily hydrocarbons as in certain alkyd resin enamels, heat setting lacquers containing oil modified phenol resins and the like, the nitrocellulose containing rolled pigment masses will, upon admixture with the lacquer, cause separation of flocks or gel formation. Consequently, they are not suitable for such lacquers. They also separate out in heat setting enamels which, for example, are set at 180° C. and in the oil lacquers. In all these cases the lacquer industry was required to produce highly pigmented, plasticizer containing viscid pastes and to use these immediately in the production of the lacquers. Attempts have been made to produce rolled pigment masses with the aid of synthetic resins such as phenolformaldehyde condensation products or oil or fatty acid modified alkyd resins. Such synthetic resin containing rolled pigment masses, however, have the disadvantage that they do not provide the required friction during their rolling or that they are not sufficiently compatible with other raw materials employed in the lacquers. Also, they harden easily and, consequently, were only prepared, sold and used in a paste form.

Attempts were also made to produce rolled masses which contained the pigment in the desired highly dispersed form and which also would be compatible with hydrocarbon soluble binding agents by subjecting pigments and nonhardening hydrocarbon soluble high molecular weight polymers such as chlorinated rubber, chlorinated polyvinylchloride, polyisobutylenes, polyvinyl acetate, rubber hydrochloride, polyacrylic acid esters such as, for example, the butyl ester to friction rolling.

These attempts, however, were not successful as:

1. The previously known dispersing agents which had been recommended for rolled pigmented masses produced with the aid of nitrocellulose such as aromatic diamines, copper salts of organic acids and the like proved to be unsuitable for dispersion in hydrocarbon soluble high molecular weight polymers. While a more or less sufficient dispersion was obtained, the resulting rolled masses do not have sufficient stability during storage and soon lose their ability to dissolve smoothly and to provide smooth, glossy coatings upon drying of such solutions.

2. Also, solutions of the above-mentioned polymers even without a pigment content mostly effect a coagulation upon admixture with oil and alkyd resin lacquers at least upon longer standing. Exceptions are chlorinated rubber and chlorinated polyvinyl chloride, solutions of which are compatible with many of the named lacquers. However, if lampblack containing rolled masses are prepared from such polymers, solutions of such rolled masses are also incompatible with oil and alkyd resin lacquers. In general, it was ascertained that in all high polymers the selection of suitable solvents was materially reduced by rolling with lampblack.

It is, therefore, an object of the invention to produce rolled pigmented masses from high polymers, especially those containing the difficultly dispersible lampblack, which rolled masses are suited for coloring usual oil and alkyd resin lacquers and other lacquer types which are thinable with hydrocarbons.

It has now been found according to the invention that the above-mentioned difficulties can be overcome to a great extent and that very good results can be obtained when derivatives of guanidine, preferably bisguanides are employed as dispersing agents in the production of the rolled pigmented masses. It was found that even rolled pigmented masses containing highly active lampblack which not only are stable during storage, but which also provide stable solutions which dry to provide smooth glossy coatings could be obtained according to the invention.

It was further found according to the invention that certain classes of high polymers are especially well suited for use in the preparation of rolled pigmented masses for coloring the various lacquer types. Hydrocarbon soluble derivatives of natural rubber, which are usually designated as rubber isomers or as cyclo rubber (see, for example, H. Barron, Brit. Plast. 10, 585, 635 and 682; 11, 86 and 141 (1939) and R. Houwink, Chemie und Technologie der Kunststoffe, second edition, vol. 2, pages 329 et seq.), proved to be especially suited for the preparation of rolled pigmented masses for use in oil rich alkyd resin lacquers. These rolled masses are even soluble in benzine alone. It was found that rolled pigmented masses prepared with vinyl ether polymers, for example, vinylisobutyl ether polymers and mixed polymers thereof with vinylchloride were especially suited for lacquers which primarily contain mixtures of esters and aromatic hydrocarbons as solvents.

It is, consequently, possible to color all customary commercial lacquers for which the known "nitrochips" were unsuited with solutions of rolled pigmented masses according to the invention.

In accordance with the invention, preferably guanidine compounds which contain a plurality of guanidine radicals are employed as dispersing agents, for example, the bisguanides or diguanides of the general formula:

in which R is an aliphatic, aromatic, aliphatic-aromatic or cyclo-aliphatic radical. Examples of such bisguanides are the tetra-, hexa- and decamethylene-bisguanides and the arylene and alkarylene-bisguanides.

It was also found that symmetrical disubstituted guanidines, which are compounds containing no free —NH₂ groups, of the general formula:

R—NH·C(NH)·NH—R for example, symmetrical di-ortho-tolyl and di-cyclohexyl guanidines, which have a certain dispersing action are also suitable, but their dispersing action is not as great as that of the bisguanides. Consequently, the rule which has been set up for amines that the dispersing action depends upon the presence of more than one —NH₂ group in the molecule is not applicable to the guanidines.

Furthermore, it was found that in certain cases monosubstituted guanidines of the general formula:

R—NH·C(NH)·NH₂ for example, alpha naphthyl guanidine were suitable.

In the preparation of rolled masses from lampblack with the various polymerization and poly condensation products used as binding agents, it was found that in selecting the best suited guanidine derivative that its compatibility with the binding agent in question had to be considered. This compatibility, however, is easily determined by mixing a solution of the dispersing agent to be tested with a solution of the binding agent and forming a film by allowing the solvent to evaporate. A smooth film free of turbidity indicates the required compatibility.

The guanidine derivatives have a decided advantage over the diamines in their substantially lower physiological activity. For example, the decamethylene-bisguanide is used in medicine as a peroral antidiabetic, whereas the diamines generally are rather poisonous and in some, a carcinogenic action has been found. The arthotolylene bisguanide is recommended as a non-poisonous vulcanization accelerator for rubber goods which must have no physiological activity. Furthermore, such product, as are almost all others of this type, is completely odorless.

While aromatic diamines are difficult to dissolve in alcohol, the guanidine compounds are easily dissolved therein. Furthermore, the guanidines possess a better colloid-chemical behavior with respect to the lacquer and also increase the stability of the rolled pigmented masses.

The aromatic diamines also possess the disadvantage that they are converted to colored substances by the action of oxygen in air and consequently, lacquer coatings containing such diamines often take on an undesirable brownish cast. Such discoloration is not obtained with the bisguanides.

In the preparation of rolled pigmented masses from lampblack and fiber forming raw materials, an addition of 2% to 10% of a dispersing agent according to the invention calculated on the lampblack suffices.

The following examples will serve to illustrate the manner in which the rolled pigment masses according to the invention can be produced and their use in the production of lacquers and the like.

EXAMPLE 1

A black pigmented rolled mass was produced as follows:

55 parts of a mixed polymer produced from 25 parts of vinyl isobutyl ether and 75 parts of vinyl chloride (Vinoflex M. P. 400), 27.15 parts of lampblack (sold under the tradename Regent), 16.50 parts of a soft resin obtained by condensation of n-butylurethane with formaldehyde (Uresin B) and 1.35 parts of arthotolylene bisguanide (Vulkazit 1000) were homogenized on friction rolls at a temperature of 60°–80° C. To assist in the homogenization, methanol can be added, preferably by dissolving the dispersing agent therein and moistening the lampblack therewith to prevent losses by dusting. After the homogenization was achieved, the rolls were cooled and the rolled mass rolled out into a thin film. The product is deep black and exhibits a high gloss on cut surfaces. It can be dissolved in butyl acetate and toluol, glycolic acid butyl ester, methoxybutanolacetate, tetrahydronaphthalene, turpentine, tetrahydrofurane and the like, advantageously in mixtures of these solvents.

The resulting solutions give deep black glossy coatings. They can be combined with the following raw lacquer materials in the preparation of black lacquers; air and oven drying alkyd resins, resin acid modified phenol aldehyde resins, maleinate resins produced from abietic acid and maleic acid anhydride, soft condensation products of butyl carbamate with formaldehyde, drying oils and standoils such as linseed oil, linseed oil-wood oil-standoil and the like.

As has already been indicated, the cyclo rubbers which are soluble in benzene have been found especially well adapted for the production of rolled pigmented masses for use in oil rich lacquers. A further advantage of these rubber derivatives is that they permit an extraordinarily high lampblack content in the rolled masses, for example, up to about 35% and over, about double the quantity possible with nitrocellulose, without deleteriously affecting the degree of dispersion of the lampblack in the finished rolled masses. Of course, gradual differences in the degree of dispersibility of the lampblack depending upon its method of production determine the optimum amount to be incorporated in the rolled masses. With some types of lampblack, it is about 20%, and in others, over 35%. The upper limits are easily determined by test rolling.

It could not be foreseen from a knowledge of the benzine solubility of the cyclized rubber that rolled masses produced therefrom containing lampblack would be compatible with oils and benzine soluble alkyd resins. There are a number of benzine soluble polymers such as polyisobutylenes whose solutions coagulate with oils and alkyd resins. Generally the solubility and compatibility of polymers is lowered when they are rolled with lampblack.

EXAMPLE 2

A black pigmented rolled mass was produced as follows:

100 parts of a commercial benzine soluble cyclized rubber sold under the trademark "Alpex," 35 parts of a resin-like condensation product obtained from benzyl carbamate and formaldehyde, 35 parts of lampblack (Neospectra II) and 10 parts of 4,4′ di-ortho-tolyl guanidine, where heated to 60° C. and homogenized on friction rolls. During the homogenization the mass heated to about 90 to 100° C. The resulting homogenized mass was cooled to room temperature and rolled into a thin film which was broken up into chips. These chips are easily dissolved in test benzine and similar solvents.

These solutions are excellent for coloring a great number of hydrocarbon soluble raw lacquer materials, for example, a maleinate resin produced from abietic acid and maleic acid anhydride, synthetic kopal (a reaction product of natural resin and phenol alcohols obtained from cresol and formaldehyde esterified with glycerine), condensation products of cyclohexanone, most oil lacquers, as well as alkyd resins and the like.

For lacquers which besides aromatics contain esters and perhaps glycol ethers, and high boiling alcohols, it is advantageous to employ polymers or mixed polymers of vinyl ethers as the base for the chips. Preferably polymers of vinyl ethers or co-polymers thereof are employed, the alkyl radical of which contains at least 3 carbon atoms, preferably 4 to 7 carbon atoms, for example vinylisobutyl ether. The degree of polymerization can correspond to a molecular weight over 3000, preferably 50,000 to 100,000. Good results were also achieved with mixed polymers of vinyl ether and vinyl chloride and the like, for example, in a proportion of 3:1.

EXAMPLE 3

A blue pigmented rolled mass was produced in the following manner:

100 parts of a polyvinylisobutyl ether of middle viscosity having a molecular weight of about 60,000, known under the tradenames "Oppanol C" and "Lutanol J," 30 parts of a hard resin produced through diene synthesis from colophony and maleic acid and subsequent esterification with glycerine known under the tradename "MK-Harz" and 5 parts of hexamethylene bisguanide were homogenized upon friction rolls. Thereafter 50 parts of Paris or Prussian blue, known under the tradename "Miloriblau" were moistened with a mixture of methanol and acetone and this was slowly added and rolled into the homogenized resin mixture. The friction rolling was continued for 30 minutes at 60° C. and after cooling, the resulting rolled mixture was rolled into thin films and broken up into chips.

The rolled masses produced according to Example 3 are very similar to the commercial rolled masses which are produced with the aid of a low viscosity collodion cotton. The products disintegrate or are easily broken up into small pieces and dissolve completely in esters, ketones and in cycloaliphatic and aromatic hydrocarbons. The solutions can be cut to a considerable degree with benzines and can be mixed with lacquers containing hydrocarbon soluble film formers such as alkyd resins, oil modified phenol resins, alkyl phenol resins, drying oils and the like. Suitably, so much of the rolled mass is added to the lacquer that 4–5 parts of pigment per 100 parts of film formers are incorporated therein. The formation of smooth high gloss lacquer surfaces can be promoted by adding a small quantity of crotonic acid to the solutions of the rolled masses before they are mixed with the colorless lacquer, for example, about 2 to 3 parts of crotonic acid per 100 parts of the non-volatile content of the finished lacquer.

The following lacquers indicate the applicability of the rolled pigment masses in the production of lacquers of such composition that the prior nitrocellulose containing rolled masses could not be combined therewith.

a. An oil lacquer 50 parts of a synthetic kopal of a melting point of about 100° C., produced by the esterification of a reaction product of natural resin acid and phenol alcohols, obtained from cresol and formaldehyde, with glycerine (see Wagner-Sarx, "Lackkunstharze," 3rd ed., Carl Hanser Verlag, Munich, Germany, 1950, pages 103–108), 25 parts of a linseed oil standoil of a viscosity of 30 poises at 20° C., 25 parts of a quick drying oil having a high content of conjugated double bonds known under the tradename "Jagolein" (see v. Mikusch in "Farbe und Lack," vol. 54, 1948, pages 140–145 and 180–181) and 3 parts of cobalt-lead-manganese naphthenate dissolved in 4 times the quantity of toluene were thinned to painting consistency with test benzine. To this were added 14 parts of pigment chips according to Example 1 dissolved in 86 parts of a solvent mixture composed of 50 parts turpentine oil, 30 parts xylol and 20 parts butyl acetate.

b. An air drying alkyd resin lacquer 100 parts of a hydrocarbon soluble oil modified alkyd resin of the castor oil type with, for example, about a 65% oil content (see Wagner-Sarx, "Lackkunstharze," 3rd ed., Carl Hanser Verlag, Munich, Germany, 1950, page 138) were mixed with 100 parts of a mixture of toluene and test benzine. If the alkyd resin is available as a solution, the concentration is adjusted to a 50% solution. To this were added 3 parts of cobalt-lead-manganese naphthenate dissolved in 4 times the quantity of toluene. To this mixture were added 14 parts of pigment chips according to the invention dissolved in 86 parts of the solvent mentioned above.

c. An alkali and acid resistant oil modified phenol resin base heat setting (baking type) lacquer 100 parts of hydrocarbon soluble plasticized phenol aldehyde resin obtained from phenol, formaldehyde and butanol (see Wagner-Sarx, "Lackkunstharze," 3rd ed., Carl Hanser Verlag, Munich, Germany, 1950, page 98) having about 72% resin content and the remainder hydrocarbons were mixed with 14 parts of black chips according to the invention dissolved in 86 parts of the above-mentioned solvent. 1% calculated upon the chips of crotonic acid were added to this chip solvent mixture before incorporation into the lacquer. If desired, such crotonic acid could also be dissolved in butyl acetate and added separately to the lacquer. This lacquer is baked at 180–190° C. for 30 minutes.

All usual assistants for lacquers such as low molecular soft and hard resins, spreaders, anti-settling agents and the like which are desired to be converted to a highly dispersed form for use in lacquers can be incorporated in the masses according to the invention during the rolling thereof. For example, the addition of highly dispersed oxides, preferably highly dispersed pyrogenically obtained silica (known under the tradename "Aerosil") as a dulling agent and in some instances as an anti-settling material can be advantageous, especially in the preparation of rolled masses for mineral oil lacquers.

I claim:

1. A method of producing a pigmented lacquer which comprises friction rolling an admixture comprising a pigment, a hydrocarbon soluble film-forming non-hardening high molecular weight polymer selected from the group consisting of hydrocarbon soluble cyclized natural rubber and hydrocarbon soluble vinyl polymers, and a bisquanide of the formula $$\overset{NH}{\underset{H_2N-C-NH-R-NH-C-NH_2}{\|}} \overset{NH}{\underset{}{\|}}$$

in which R is a radical selected from the group consisting of saturated aliphatic, aromatic, aliphatic aromatic hydrocarbon radicals until a homogenized rolled pigmented mass is obtained and dispersing said rolled pigmented mass in a lacquer containing a solvent substantially consisting of at least one hydrocarbon compound.

2. A process according to claim 1, in which said high molecular weight polymer is a hydrocarbon soluble cyclized rubber.

3. A process according to claim 1, in which said high molecular weight polymer is a hydrocarbon soluble vinyl isobutyl ether polymer.

4. A process according to claim 1, in which said high molecular weight polymer is a hydrocarbon soluble vinyl isobutyl ether vinyl chloride copolymer.

5. A process according to claim 1, in which said admixture also contains a benzine soluble abietic acid maleic acid anhydride resin.

6. A process according to claim 1, in which said admixture also contains a benzine soluble resin-like condensation product of a mono-urethane and an aldehyde.

7. A process according to claim 1, in which said pigment is lampblack.

References Cited in the file of this patent

UNITED STATES PATENTS

| Number | Name | Date |
|---|---|---|
| 1,555,256 | Romani | Sept. 29, 1925 |
| 2,119,400 | Nowak | May 31, 1938 |
| 2,519,388 | Loukomsky et al. | Aug. 22, 1950 |
| 2,600,414 | Mast et al. | June 17, 1952 |

OTHER REFERENCES

Smith et al.: Article in Ind. End. Chem., 20, 298–300, March 1928.